UNITED STATES PATENT OFFICE.

WILHELM HERZBERG AND EDUARD THON, OF BERLIN, GERMANY, ASSIGNORS TO ACTIEN GESELLSCHAFT FÜR ANILIN FABRIKATION, OF BERLIN, GERMANY.

PROCESS OF NITRATING AROMATIC AMINS.

No. 800,913.      Specification of Letters Patent.      Patented Oct. 3, 1905.

Application filed September 30, 1904. Serial No. 226,698. (Specimens.)

*To all whom it may concern:*

Be it known that we, WILHELM HERZBERG and EDUARD THON, of Berlin, in the Kingdom of Prussia, German Empire, have invented new and useful Improvements in the New Process of Nitrating Aromatic Amins; and we do hereby declare that the following is a full, clear, and exact description of the invention, which will enable others skilled in the art to which it appertains to make and use the same.

Our process consists in heating with diluted nitric acid the so-called "arylsulfamids"—*i. e.*, a sulfo derivative of an aromatic primary or secondary amin. These products are obtained by the reaction of benzene-sulfo-chlorid or para-toluene-sulfo-chlorid upon primary or secondary amins of the benzene series, their derivatives or homologues, so that the simplest form of the products to be nitrated is represented by the formula $$C_6H_5.NR.SO_2.C_6H_4.R_1,$$

R standing for the hydrogen atom or methyl, ethyl, &c., and $R_1$ standing for the hydrogen atom or the group $CH_3$. The nitration of such compounds was hitherto performed in a solution in concentrated acetic acid by the action of concentrated nitric acid. (Compare *Berichte der Deutschen Chemischen Gesellschaft* XXXV, page 1440.) This method is not adapted for industrial purposes because it is a very expensive one and does not yield a uniform product, dinitro derivatives being produced besides mononitro compounds. Also the usual manner of nitration—*i. e.*, by nitrating in concentrated sulfuric acid—is not advantageous, because elimination of the group $SO_2.C_6H_4.R_1$, and therefore decomposition takes place.

Now our new method shows a great advantage in respect to these processes hitherto known.

The nitro derivatives obtained according to our process are nearly chemically pure, and therefore immediately fit for use in manufacturing other products—as, for instance, dyestuffs—because only the benzene nucleus annexed to the $NH_2$ group is attacked by the nitric acid. Moreover, only one nitro group enters this benzene nucleus and takes, in every case, the para position to the $NH_2$ group, so that no waste products occur with our process. The yield, therefore, is a nearly theoretical one.

The results of our new process are not altered in any way if we suspend the substance to be nitrated in water or if we use a suitable solvent—as, for instance, alcohol, acetone, or benzene. If this solvent is not miscible with diluted nitric acid, the mixture is to be well agitated.

The nitro derivatives obtained according to our process may be converted into nitro-amins by the action of concentrated sulfuric acid, or they may be first reduced in the usual manner and then treated with concentrated sulfuric acid. In both cases the resulting products—*i. e.*, the nitro-amins or the diamins—serve as starting products for the manufacture of dyestuffs.

In carrying out our process we proceed as follows, the parts being by weight:

1. 26.1 parts of para-toluolsulfo-ortho-toluidid, obtained by the action of para-toluolsulfochlorid $(CH_3.C_6H_4.SO_2.C_1)$ upon ortho-toluidin, are finely pulverized, mixed with two hundred parts of water and forty-two parts of nitric acid of 1.18 density added. The mass is then heated to the boil for about six to eight hours while stirring well. After this time the reaction is completed, so that the yellow precipitate of the nitro derivative can be filtered off, washed with water, and dried. By recrystallization from alcohol it is obtained in the shape of slightly yellow crystals melting at 172°. The product is identical with that obtained by Reverdin by the action of concentrated nitric acid upon para-toluolsulfo-ortho-toluidid dissolved in acetic acid.

2. Prepare a mixture of two hundred and sixty-three parts of benzene-sulfo-ortho-anisidid obtained by the action of benzene-sulfochlorid $(C_6H_5.SO_2.C_1)$ upon ortho-anisidin:

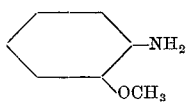

two thousand two hundred parts of water and one hundred and fifty parts of concentrated nitric acid, (1.4 density.) The whole mass is then heated on a water-bath while stirring for several hours. The end of the reaction is shown by the fact that a sample of the yellow nitro product melts at 181°. This having taken place, the nitro product is obtained by filtration, washing, and drying. By recrystallization from alcohol it results in the shape of yellow bright small leaves.

3. 27.3 parts of para-toluol-sulfo-ortho-ethylanilid obtained by the action of para-toluol-sulfo-chlorid upon ethylanilin are mixed with one hundred and fifty parts of water, add 20.4 parts of concentrated nitric acid, (1.4 density,) and heat the mass while stirring for about eight hours upon a water-bath. The substance to be nitrated melts to an oil and becomes yellow. If this yellow coloration does not increase, the mass is allowed to cool. The oil then solidifies and the nitro derivative is separated by filtration, washed, and dried. By recrystallization from alcohol it is obtained in the shape of nearly-colorless prisms melting at 107°.

4. One dissolves 61.1 parts of para-toluol-sulfo-ortho-toluidid (compare Example 1) in thirty-two parts of ethyl alcohol, adds forty parts of nitric acid, (1.18 density,) and heats this mixture to the boil on a water-bath for about twelve hours, using a reflux condenser. The nitro derivative thus formed is heavy, soluble in alcohol, and separates in crystals. The reaction is completed if the whole mass solidifies to a pulp of crystals. The nitro derivative is separated from the mother lyes by filtration, washed, and dried. It melts at 175°.

5. 24.7 parts of para-toluol-sulfo-anilid are dissolved in twenty-five parts of benzene. Add forty parts of nitric acid, (1.18 density,) stirring well, and heat the mass to the boil for about ten hours in a vessel provided with a reflux condenser. The heavy soluble nitro product separates in yellow crystals and is isolated by filtration, washed, and dried. It melts at 191°.

It is obvious to those skilled in the art that many modifications may be made with our process without departing from the scope of our invention, especially the duration of heating, and the temperature at which the nitration is operated may be varied within certain limits—that is to say, if we take a higher temperature in carrying out our process the duration of the reaction will be a shorter one. The dilution of the nitric acid and the proportion of it may also be varied within wide limits. For instance, in many cases the proportion of nitric acid can exceed up to five or six molecules, the quantity corresponding to one molecule of the starting product.

Having now described our invention and in what manner the same is to be performed, what we claim as new is—

1. The process for nitrating the hereinbefore-described arylsulfamids of an aromatic amin, which process consists in heating the said arylsulfamids with diluted nitric acid.

2. The process for nitrating the hereinbefore-described arylsulfamids of an aromatic amin, which process consists in heating the said arylsulfamids with a nitric acid of 1.03 density.

3. The process for nitrating the hereinbefore-described arylsulfamids of an aromatic amin, which process consists in heating the said arylsulfamids with a nitric acid of 1.03 density to 100°.

In witness whereof we have hereunto signed our names this 17th day of September, 1904, in the presence of two subscribing witnesses.

WILHELM HERZBERG.
EDUARD THON.

Witnesses:
WOLDEMAR HAUPT,
GUSTAV LUCHT.